Patented Mar. 16, 1954

2,672,438

UNITED STATES PATENT OFFICE 2,672,438

HYDROCHLORINATION OF UNSATURATED ORGANIC COMPOUNDS BY ELECTRICAL DISCHARGE

Herman Johannes den Hertog and Pieter Bruin, Amsterdam, Netherlands, assignors to Shell Development Company, San Francisco, Calif., a corporation of Delaware No Drawing. Application September 22, 1950, Serial No. 186,301

Claims priority, application Netherlands September 30, 1949

7 Claims. (Cl. 204—169)

This invention relates to a process for preparing chlorine-containing compounds by the hydrochlorination of organic compounds containing one or more aliphatic multiple bonds. In particular, the method is one whereby "abnormal" addition of the hydrogen chloride to the unsaturated reactant is obtained by conducting the reaction in the presence of hydrogen bromide and under the influence of silent electric discharges.

It has long been known that hydrogen halides may be added to unsaturated hydrocarbons and to various unsaturated derivatives thereof, Markownikoff stating, in 1870, that "if an unsymmetrical hydrocarbon combines with a halogen acid, the halogen adds to the carbon atom with fewer hydrogen atoms, i. e. to the carbon atom which is more under the influence of other carbon atoms." The same investigator further determined that when a hydrogen halide is added to a halogenated unsaturated compound such as vinyl chloride or a chlorinated propylene (i. e. to unsaturated hydrocarbons wherein one of the unsaturated carbon atoms carries a halogen atom, or wherein these unsaturated carbon atoms contain dissimilar numbers of halogen atoms directly attached thereto), the halogen atom of the hydrogen halide will add to the double bonded (unsaturated) carbon atom which carries the greater number of halogen atoms, while the hydrogen atom of the hydrogen halide molecule attaches to the adjacent unsaturated carbon atom. The above type of hydrohalogenation is termed "normal" to distinguish it from the "abnormal" addition which takes place when the hydrogen and halogen atoms are added in positions which are interchanged with respect to addition according to the above-outlined Markownikoff rule.

The compounds produced as a result of the abnormal addition of hydrogen chloride to aliphatically unsaturated compounds often possess greater utility for a variety of purposes than do the corresponding compounds produced when the addition takes place in the normal manner. This is particularly the case when dealing with terminally unsaturated compounds. Accordingly, a variety of methods have been proposed for so controlling the reaction that the abnormal hydrochlorination will at least predominate. Many of the methods hitherto proposed for the purpose suffer disadvantages of one type or another, and it is an object of the present invention to provide a process whereby aliphatically unsaturated compounds may be subjected to abnormal hydrochlorination in a new and efficient manner. A more particular object is to provide a method of this character wherein the proportion of chlorine-containing product formed as a result of normal addition of the hydrogen chloride is either eliminated or reduced to small proportions.

It is our discovery that the foregoing objects are achieved when hydrogen chloride is reacted with aliphatically unsaturated organic compounds in the presence of hydrogen bromide and under the influence of silent electric discharges. When the reaction is carried out under these conditions the abnormal addition is strongly promoted and the resulting product is found to consist substantially, or even entirely, of the abnormal HCl-addition product. Thus, in the case of a 1-alkene reactant, the product is a 1-chloroalkane.

The aliphatically unsaturated organic compounds which may be treated according to the process of this invention are those which contain at least three carbon atoms and possess one or more olefinic and/or acetylenic linkages in an asymmetrical position of the molecule. Representative hydrocarbons falling into this class are propylene, 1-butene, 1-pentene, 2-pentene, 1-hexene, 4-methyl-1-pentene, 4,4-dimethyl-1-pentene, 4-methyl-2-pentene, 1-octene, 1-decene, styrene, cyclohexene, 3,4-dimethylcyclohexene, 1,4-di-phenyl-2-butene, propyne, 1-butyne, 1-hexyne, 1-hexadecene, 1-octadecene, 2-octadecene, 1-eicosene, 1-docosene, 1-pentacosene, 1,3-butadiene, 1,3-pentadiene, 1,4-pentadiene, 1,5-hexadiene, and the like. The above compounds, and their various homologues, may be substituted in a varying degree and still be suitable for use as reactants in the process of the present invention. For instance, the unsaturated reactant may contain one or more halogen atoms attached to saturated and/or unsaturated carbon atoms, representative reactants of this variety being allyl chloride, crotyl chloride, methallyl chloride, allyl bromide, and the like. Other examples of substituted, unsaturated reactants are methyl acrylate, methyl methacrylate, divinyl ether, diallyl ether and dimethallyl ether. A preferred class of unsaturated reactant compounds is made up of the alkenes containing at least three carbon atoms in the molecule, while a still more preferred class of reactant compounds comprises the alkenes of this variety which contain a terminal double bond, as represented by propene, 1-butene, 1-pentene, 1-hexene, 1-octene, 1-decene, 1-dodecene, 1-pentadecene, 1-octadecene, and 1-eicosene, for example.

Instead of using pure compounds as the unsaturated reactant, there may be employed mixtures of various aliphatically unsaturated compounds. A representative reactant mixture of this type is made up of the monoalkenes containing, in general, from about 10 to 25 carbon atoms which is derived on the cracking of a paraffin wax. Preferred wax olefin mixtures of this character, for purposes of the present invention, contain from about 10 to 18 carbon atoms.

As noted above, the reaction of the present invention takes place only in the presence of hydrogen bromide. The latter compound will perform its intended function when present in quantities as small as about 0.15 mole per mole of the olefinic or other unsaturated reactant, though there is preferably employed from about 0.25 to 1 mole of hydrogen bromide per mole of the unsaturated reactant. Larger proportions of hydrogen bromide than this are generally undesirable since the formation of undesirable, high-boiling by-products is then favored. As regards the proportions of the unsaturated and hydrogen chloride reactants, it has been found that the process of the invention can be carried out when only the theoretically required amounts of hydrogen chloride are employed. However, it is preferred to apply a considerable excess of the hydrogen chloride (for example, a four to eight-fold excess thereof) since in this manner one obtains higher yields of the desired abnormal addition products.

It has been noted above that the process of the present invention takes place only under the influence of silent electric discharges, electrical treatments of this variety being also known in the art as "voltolization." In general, the voltolization conditions employed in other processes may also be employed in the present invention. Thus, for example, one may use an alternating current of from about 50 to 1,000 cycles, and voltages of from about 5,000 to 25,000 volts, though voltages as high as 50,000 volts can also be utilized. The voltolization unit usually consists of a condenser type apparatus, with the discharge taking place in the space between the two insulated electrodes through which the reaction mixture is circulated.

The process of this invention can be carried out in either the liquid or the gaseous phase, though the latter is preferred. In either case, there may be employed a considerable range of reaction temperatures and pressures. Thus, while the reaction is generally conducted at ambient or only slightly raised temperatures (i. e. at from about 20 to 50° C.) and under prevailing atmospheric pressures, higher or lower temperatures and pressures can also be used. In some cases, as with propene, for example, the yield of the desired abnormal, HCl-addition product is increased by working at higher temperatures, as between 50 and 150° C., though the use of temperatures above 150° C. is to be avoided, as a rule, on account of the increasing amounts of undesirable, high-boiling by-products which are formed at such temperatures.

The reaction of this invention may take place in either the presence or absence of diluents such as nitrogen, paraffinic hydrocarbons, or other gases which are inert under the reaction conditions employed. Again, while the process may be conducted in either a continuous or a discontinuous manner, there are preferably employed continuous processes in which the reactant mixture is conducted uninterruptedly through an ozonizer or other voltolization instrument wherein the reaction mixture is subjected to the influence of silent electric discharges, and from which the resulting reaction mixture is continuously discharged.

The speed of the present HCl-addition reaction varies from one reactant to another as well as with varying voltolization conditions. Thus, under otherwise identical conditions, the speed of the reaction increases with a rise in voltage of the electric discharge device, while the speed diminishes as the distance separating the surfaces between which the electric discharges take place, becomes greater. Accordingly, with apparatus wherein the distance in question does not exceed from about 1 to 2 mm., good results are obtained using about 10,000 volts, though when apparatus is used in which this distance becomes more than 2 mm., it becomes necessary to use higher voltages, as 20,000 volts or more, in order to attain the same speed of reaction.

It should be noted that the hydrogen bromide supplied the reaction mixture is itself used up as the reaction progresses, it adding abnormally to the unsaturated reactant just as does the hydrogen chloride. The organic bromides so formed are valuable by-products which may readily be separated from the other components of the reaction mixture when the latter is worked up. Thus, after being washed with water to remove unreacted hydrogen halide, the reaction mixture may be fractionally distilled, whereby the desired chlorine addition compound, as well as that formed with HBr, are separated from any unconverted, unsaturated reactant and from the high-boiling by-products formed in the reaction. The unreacted starting materials so recovered can then be used afresh in the process.

The organic, chlorine-containing compounds prepared by means of the process of this invention are valuable products which are of particular importance as intermediates for the preparation of other materials. Thus, for example, the primary alkyl chlorides obtained from alkenes with terminal double bonds may be converted into other compounds with a terminal functional group, such as alcohols, rhodanides, sulphuric acid ester salts, carboxylic acids, carboxylic acid esters, amines, and the like.

The process according to the invention is further illustrated by the following examples.

*Example I*

A mixture of propene, dry hydrogen chloride and dry hydrogen bromide in molar proportions of 1:7.5:0.5, respectively, at a temperature of 20° C., was passed at a rate of about 240 cc. per minute through four Siemens-type glass ozonizers coupled in series, the distance between the inner and outer tube in each ozonizer amounting to 1 mm. and the volume of the discharge space in each to about 20 cc. In the ozonizers the mixture was exposed to the influence of silent electric discharges with a potential difference of 10,000 volts, the alternating current employed having a frequency of 50 cycles per second. Analysis of the reaction mixture obtained showed that 5% of the propene had been converted into 1-chloropropane per pass through the ozonizers, and that no formation of 2-chloropropane had taken place. Furthermore, part of the propene had reacted with the HBr to form 1-bromopropane.

On repeating the experiment under the same circumstances, but in the absence of HBr, 3% of the propene was converted into 2-chloropropane and but 0.5% thereof into 1-chloropropane, per pass through the ozonizers.

*Example II*

A mixture of propene, dry hydrogen chloride and dry hydrogen bromide, in molecular proportions of 1:7:1, was passed at a rate of about 270 cc. per minute through a Siemens-type ozonizer maintained at a temperature of 75° C., in which the distance between inner and outer tube was 2.5 mm. and the volume of the discharge space 150 cc. The gas mixture passing through the ozonizer was exposed to silent electric discharges with a potential difference of 20,000 volts. In this case, 24% of the propene passed through the ozonizer was converted into 1-chloropropane, while 15% thereof was converted to 1-bromopropane.

*Example III*

A mixture of 1 volume of 1-butene, 7 volumes of dry hydrogen chloride, and 0.5 volume of dry hydrogen bromide was passed at a rate of about 400 cc. per minute through five Siemens-type glass ozonizers connected in series and maintained at a temperature of 20° C. In each ozonizer the distance between the inner and outer tubes amounted to about 1 mm. and the volume of the discharge space to about 20 cc. The gaseous mixture was subjected to the influence of silent electric discharges with a potential difference of 10,000 volts. In this operation, 10% of the 1-butene which had been passed through the ozonizer was thus converted into 1-chlorobutane, while no 2-chlorobutane was formed. At the same time, 10% of the 1-butene reacted to form bromobutane, principally 1-bromobutane.

When the experiment was repeated under the same conditions but in the absence of hydrogen bromide, only 2% of the 1-butene was converted into 1-chlorobutane and 4% into 2-chlorobutane.

*Example IV*

A gaseous mixture of 1-hexene, hydrogen chloride and hydrogen bromide in molecular proportions of 1:7:0.5 (obtained by introducing 1-hexene dropwise into a gaseous stream of the two hydrogen halides), was passed at a rate of 0.165 g. of 1-hexene, 330 cc. hydrogen chloride, and 24 cc. hydrogen bromide per minute, and at a temperature of 20° C., through a series of five ozonizers as described in Example III. In this case 8% of the 1-hexene passed through the ozonizers was converted into chlorohexane, which was found to consist exclusively of 1-chlorohexane. In addition, 12% of the 1-hexene was converted into a mixture of 1-bromo- and 2-bromohexane.

*Example V*

The operation of Example IV is repeated using a Stanlow cracked wax olefin mixture instead of the 1-hexene. The wax olefin mixture here employed is one which contains from about 10 to 18 carbon atoms in the molecules of its respective components and which has an average molecular weight of about 185. The various olefins in the mixture contain substantially only terminal double bonds and have an average of about 0.9 double bond per molecule. In this case, again approximately 10% of the wax olefin mixture is converted to a mixture made up of the corresponding abnormal addition product with hydrogen chloride. In so far as could be determined, none of the olefin mixture reacted with the hydrogen chloride via the normal addition mechanism.

As will be noted from the foregoing examples, the reaction time (i. e., time during which the reaction mixture is exposed to the influence of the silent electric discharges) may be relatively short, and good results are obtained with periods of a minute or less. Longer reaction times, for instance more than about 15 minutes, are as a rule less suitable since they bring about the formation of substantial quantities of undesirable high-boiling by-products.

The invention claimed is:

1. In a process for effecting abnormal addition of hydrogen chloride to an organic compound containing at least three carbon atoms and having an unsaturated linkage of aliphatic character in asymetrical position in the molecule, the step comprising reacting hydrogen chloride and said organic compound in the presence of hydrogen bromide and under the influence of silent electric discharges for a period of not more than about 15 minutes whereby a hydrogen chloride addition product having the same number of carbon atoms as the starting organic compound is produced as the predominant product.

2. In a process for effecting abnormal addition of hydrogen chloride to an organic compound containing at least three carbon atoms and having an olefinic linkage in asymetrical position in the molecule, the step comprising reacting hydrogen chloride and said organic compound in the presence of hydrogen bromide and under the influence of silent electric discharges for a period of not more than about 15 minutes whereby a hydrogen chloride addition product having the same number of carbon atoms as the starting olefinic compound is produced as the predominant product.

3. In a process for preparing primary alkyl chlorides, the step comprising reacting hydrogen chloride with an alkene having a terminal olefinic linkage in the presence of hydrogen bromide and under the influence of silent electric discharges for a period of not more than 15 minutes, whereby addition of hydrogen chloride to the double bond of said alkene with formation of the corresponding monochloroparaffin takes place as the predominant reaction.

4. The process of claim 3 wherein the hydrogen chloride is employed in excess and wherein the hydrogen bromide is employed in the proportion of from about 0.15 to 1 mole, per mole of the alkene reactant.

5. The process for the production of primary alkyl chlorides which comprises reacting hydrogen chloride with a wax olefin mixture in the presence of hydrogen bromide and under the influence of silent electric discharges for a period of not more than about 15 minutes whereby hydrogen chloride addition products having the same number of carbon atoms as the starting wax olefin mixture are produced as the predominant product.

6. In a process for preparing 1-chloropropane, the step comprising reacting propene with an excess of hydrogen chloride in the presence of hydrogen bromide and under the influence of silent electric discharges for a period of not more than 15 minutes.

7. The process of claim 6 wherein there is employed from 0.15 to 1.0 mole of hydrogen bromide for each mole of propene.

HERMAN JOHANNES DEN HERTOG.
PIETER BRUIN.

References Cited in the file of this patent

UNITED STATES PATENTS

| Number | Name | Date |
|---|---|---|
| 1,012,149 | Pfeifer | Dec. 19, 1911 |
| 1,710,155 | Egloff et al. | Apr. 23, 1929 |
| 2,307,552 | Vaughan et al. | Jan. 5, 1943 |
| 2,376,675 | Evans et al. | Jan. 5, 1943 |
| 2,398,481 | Vaughan et al. | Apr. 16, 1946 |

OTHER REFERENCES

Balandin et al., Chemical Abstracts, vol. 34 (1940), p. 7757.

Glockler et al., Electrochemistry of Gases, (1939), p. 201.

Glockler et al., Transactions Electrochemical Society, vol. 88 (1945), pp. 63–72.